May 30, 1933.  T. G. McMAHON  1,912,212

METHOD OF MAKING DENTIST'S MODELS

Filed Oct. 23, 1930

INVENTOR
Thomas G. McMahon
BY
Ramsey & Kent
ATTORNEYS

Patented May 30, 1933

1,912,212

UNITED STATES PATENT OFFICE

THOMAS G. McMAHON, OF CHICAGO, ILLINOIS, ASSIGNOR TO THOMAS J. DEE & COMPANY, OF CHICAGO, ILLINOIS, A CORPORATION OF ILLINOIS

METHOD OF MAKING DENTIST'S MODELS

Application filed October 23, 1930. Serial No. 490,565.

The present invention relates broadly to the art of dentistry and more especially to an exhibitional model adapted for use in demonstrating various dental constructions and the method of making the same.

It is particularly desirable that a dentist shall be able to demonstrate to his patients the manner and method of attaching removable bridge work and other mechanical false teeth arrangements and constructions so that the patient may understand and choose the particular kind of mechanical false teeth construction which appeals to his fancy and which is best adapted for his particular needs.

In order to be able to carry out the above specified demonstrations, the present invention comprises a suitable model in glass of an upper or lower jaw structure including gums from which teeth have been extracted and including natural teeth which remain. These models in glass are made natural size and are capable of association with bridge work filling the vacant spaces with artificial teeth suitably mounted upon bridges and with gums or other means of attaching the bridge work to the representations of natural teeth. This character of model must be such that it may be easily cleaned in order to be sanitary, of sufficient strength to stand substantially rough usage, and of sufficient rigidity to hold its shape under frequent demonstrations and rough usage. Many materials have been tried for this purpose and none of which meet the above requirements. Actual demonstration of models made in glass have proved their decided utility over other attempts to make up more or less temporary models of plaster, etc., to demonstrate an individual's needs. The models of the present invention are not made up from impressions of each patient's mouth but are made up in sufficient number from representative natural impressions to demonstrate the manner in which the several problems of replacement of natural teeth with false teeth may be carried out throughout the range of the human jaw, and in this way, the individual needs of a patient may be demonstrated to him to his satisfaction. Furthermore, the present models are particularly valuable for teaching dental students the methods and means of solving different problems relating to the insertion of artificial teeth for missing teeth in a human mouth. These models also are used in dental laboratories in making up various bridge constructions and are utilized to exhibit improved dental work as exhibits at dental meetings, etc. They are also used both in lecture work and in clinic work.

The preferred form of invention comprises a model representing a portion of a human jaw with a few natural teeth therein, which model preferably is constructed of opaque, translucent glass, which is not affected by atmospheric changes and which meets the mechanical requirements of strength and durability.

While individual models of the human jaw with natural teeth missing therefrom may be cast or formed in any desirable way, the preferred method of making up the present models is to make a cast and mold from a human jaw having a complete set of teeth therein. Glass models with all the teeth therein are then made from the said mold and in order to make up models showing the results of extracting teeth from the human jaw, certain teeth in the full toothed model are ground away and the model is then polished so that it represents the desired natural condition after teeth have been extracted. By this method, a single mold may be used to cast a plurality of full toothed models from which teeth as represented in various portions of the mouth may be ground away and all of the possible permutations and combinations of missing teeth may be made from this single mold.

Figure 1:
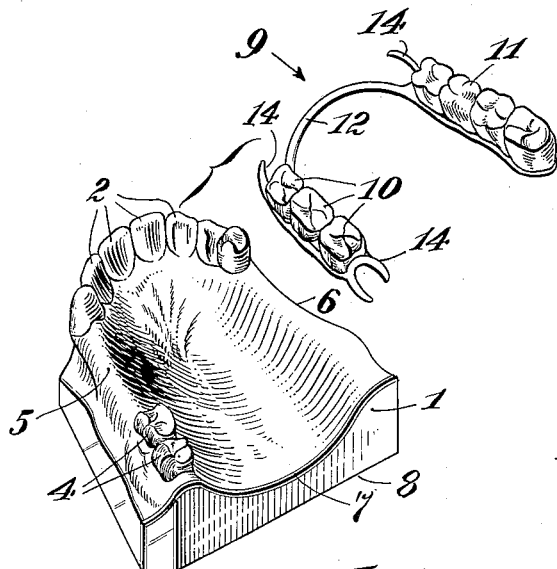
Fig. 1 is a perspective view of one of the finished models illustrating bridge work separated therefrom.

Referring now to the drawing, the present invention comprises a body 1 preferably of opaque glass provided with representations of frontal teeth 2 and with back teeth 4 on one side thereof and with gum portions 5 and 6 over areas from which teeth have been extracted. The back of the model is slightly concave as at 7, and terminates in a flat plane to comprise a base 8.

Figure 2:
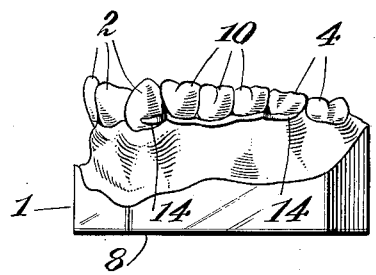
Fig. 2 is a side elevation of a model showing the bridge work in place.
Figure 4:
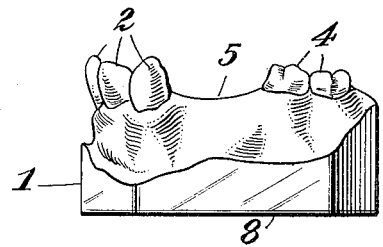
Fig. 4 is an elevation of the model shown in Fig. 3.
Figure 3:
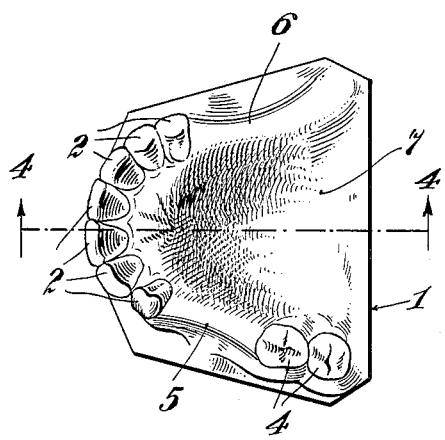
Fig. 3 is a plan view of the model with the bridge work removed.
Figure 5:
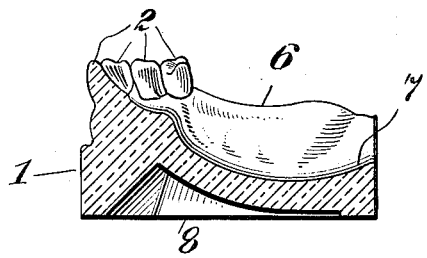
Fig. 5 is a sectional view of a model on 5—5 of Fig. 3.

Bridge work 9 comprises artificial teeth 10 to fit over the gum portion 5 and artificial teeth 11 to fit over the gum portion 6. These sections of artificial teeth 10 and 11 may be joined by a metal arch 12, which fits inside the frontal teeth 2 on the model and suitable retaining metal clips or clamps 14 are adapted to engage the representations on the model of natural teeth to retain the bridged artificial teeth in position as illustrated in Fig. 2.

These models may comprise the representation in glass of a human jaw having a full set of teeth, which models may be useful in teaching dentistry. Where special conditions of missing teeth are to be demonstrated by these models, the desired model may be made by grinding away the said teeth representations and polishing the ground surfaces.

The said models, a representative form of which is herewith disclosed, have demonstrated by extensive actual use the practicability of these said models made from glass.

Having thus described my invention, what I claim is:—

1. The method of making dentist's models comprising molding a model of a portion of a human mouth in glass with said model provided with representations of human teeth, grinding away certain of said teeth representations to simulate a gum from which teeth have been extracted and polishing the ground surfaces.

2. The method of making dentist's models comprising grinding away tooth representations on a glass model of a human jaw and polishing the ground surfaces to simulate the shape and form of a human gum from which teeth have been extracted.

THOMAS G. McMAHON.